US008459203B2

(12) United States Patent
Mauchle et al.

(10) Patent No.: US 8,459,203 B2
(45) Date of Patent: Jun. 11, 2013

(54) POWDER FEEDING METHOD, POWDER FEEDING APPARATUS AND ELECTROSTATICAL POWDER SPRAY COATING APPARATUS

(76) Inventors: Felix Mauchle, Abtwil (CH); Christian Marxer, Mauren Furstentum (LI); Hanspeter Vieli, Goldach (CH)

( * ) Notice: Subject to any disclaimer, the term of this patent is extended or adjusted under 35 U.S.C. 154(b) by 378 days.

(21) Appl. No.: 12/679,074

(22) PCT Filed: Sep. 8, 2008

(86) PCT No.: PCT/IB2008/002326
§ 371 (c)(1), (2), (4) Date: Mar. 19, 2010

(87) PCT Pub. No.: WO2009/037540
PCT Pub. Date: Mar. 26, 2009

(65) Prior Publication Data

US 2011/0162579 A1 Jul. 7, 2011

(30) Foreign Application Priority Data

Sep. 22, 2007 (DE) ......................... 10 2007 045 330

(51) Int. Cl.

| | |
|---|---|
| ***B05C 11/00*** | (2006.01) |
| ***B67B 7/00*** | (2006.01) |
| ***G01F 11/00*** | (2006.01) |
| ***G01F 13/00*** | (2006.01) |
| ***B65D 88/54*** | (2006.01) |
| ***B65D 83/00*** | (2006.01) |

(52) U.S. Cl.
USPC ........... 118/704; 118/695; 118/696; 118/699; 118/702; 222/1; 222/251; 222/252; 222/394

(58) Field of Classification Search
USPC ............... 118/302–303, 308–316, 421.1, 427
See application file for complete search history.

(56) References Cited

U.S. PATENT DOCUMENTS

| | | | | |
|---|---|---|---|---|
| 7,410,329 | B2 | 8/2008 | Simontacchi | |
| 2005/0095071 | A1 | 5/2005 | Kleineidam et al. | |
| 2005/0178325 | A1* | 8/2005 | Herre et al. | 118/308 |
| 2005/0207901 | A1 | 9/2005 | Klobucar et al. | |
| 2005/0229845 | A1* | 10/2005 | Mather et al. | 118/308 |
| 2006/0093442 | A1 | 5/2006 | Kleineidam et al. | |
| 2006/0185671 | A1 | 8/2006 | Durr et al. | |
| 2007/0095945 | A1 | 5/2007 | Keudell et al. | |

FOREIGN PATENT DOCUMENTS

| | | |
|---|---|---|
| CH | 656371 A5 | 6/1986 |
| DE | 19611533 | 9/1997 |

(Continued)

OTHER PUBLICATIONS

ISR for PCT/IB2008/002326 dated Apr. 17, 2009.

*Primary Examiner* — Dah-Wei Yuan
*Assistant Examiner* — Jethro Pence
(74) *Attorney, Agent, or Firm* — Lowe Hauptman Ham & Berner, LLP

(57) ABSTRACT

A coating powder feed method, coating powder feeding device, electrostatic powder spraycoating apparatus containing such a coating powder feeding device. The invention includes a dense phase powder pump fitted with at least one feed chamber. A control signal to create a partial vacuum in the feed chamber is generated no earlier than simultaneously with, preferably by a predetermined delay time after, a control signal opening a powder intake valve of the feed chamber, as a result of which the beginning of partial vacuum buildup in the feed chamber shall take place no earlier than simultaneously with the initial opening of the powder intake valve or by a defined time delay after the opening of the powder intake valve.

10 Claims, 2 Drawing Sheets

FOREIGN PATENT DOCUMENTS

Figure 1:
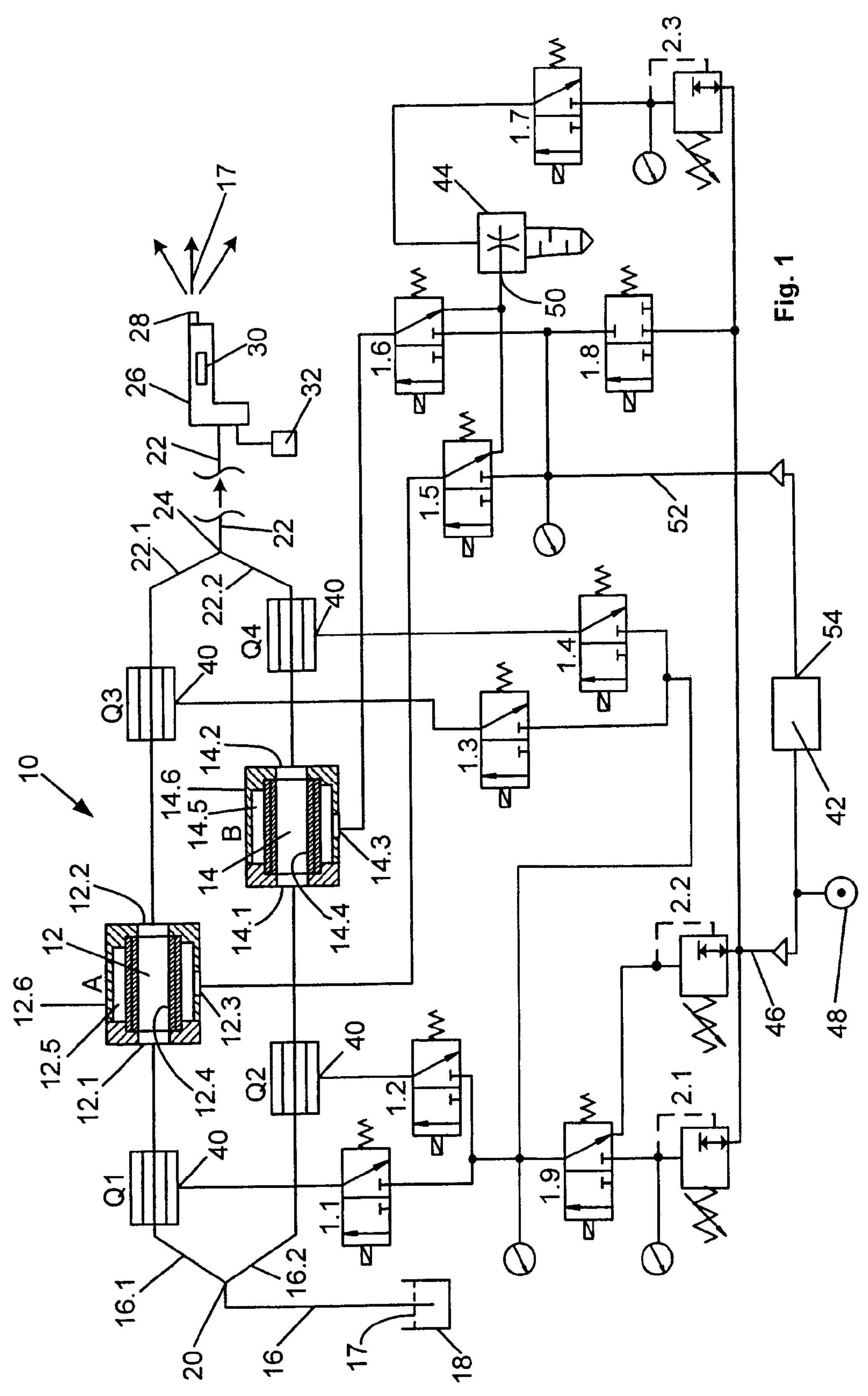

| | | | |
|---|---|---|---|
| DE | 102004008495 | | 9/2005 |
| EP | 0124933 | A | 11/1984 |
| EP | 0606577 | | 7/1994 |
| EP | 1644131 | | 4/2006 |
| EP | 1772195 | | 4/2007 |
| JP | 9071325 | | 3/1997 |

* cited by examiner

POWDER FEEDING METHOD, POWDER FEEDING APPARATUS AND ELECTROSTATICAL POWDER SPRAY COATING APPARATUS

RELATED APPLICATION

The present application is national phase of International Application Number PCT/IB2008/002326, filed Sep. 8, 2008, and claims priority from German Application Number 10 2007 045 330.4 , filed Sep. 22 , 2007, the disclosures of which are hereby incorporated by reference herein in their entirety.

In accordance with the pending claims, the present invention relates to a powder feeding method, to a powder feeding device and to an electrostatical powder spraycoating apparatus comprising a powder feeding device.

In particular, the present invention relates to methods and apparatus/equipment containing a dense phase powder pump. Dense phase powder pumps comprise at least one feed chamber fitted with a powder intake valve and a powder outlet valve. The chamber may be connected alternatively to a vacuum source to aspirate powder, through its open powder intake valve while the powder outlet valve is closed, into the feed chamber, or subsequently thereto to a source of compressed gas, usually compressed air, in order to expel the coating powder from the feed chamber through the open powder outlet valve while the powder intake valve is closed. When two feed chambers are configured in parallel, powder will be aspirated into one chamber while powder is discharged from the other, whereupon powder will be discharged from the first chamber and new powder is aspirated into the other. When two or more feed chambers are configured in parallel, a continuous flow of powder may be implemented in a powder discharge conduit into which issue the powder outlet valves of all feed chambers.

As regards another kind of pump not object of the present invention, injectors aspirate coating powder into a flow of feeding air where said powder mixed with this flow and is fed through a discharge conduit to a powder spraycoating tool. Such powder spraycoating equipment is known for instance from the European patent document EP 0606577 B1.

Illustratively the following documents disclose a variety of coating powder feeding device containing a dense phase powder pump: JP 09/071,325 A, DE 196 11 533 B4, US 2006/0193704 A1 (=EP 1 644 131A2), U.S. Pat. No. 7,150,585 B2 (=WO 2004/087331 A1) and US 2005/0178325 A1 (=EP 1 566 352 A2). The dense phase powder pumps are fitted with at least one, usually two feed chambers. A vacuum intake of the feed chamber—in some designs also a compressed air intake in the feed chamber—is fitted with a filter permeable to air but not to coating powder. For decades the filter material has conventionally been a sintered material. Typically the powder intake and outlet valves are pinch valves that have already been successfully used with injector pumps in feeding thin phase powders because being less susceptible to aggregating powder within them and being more easily cleansed by the gas flow through them than are other types of valves.

The patent document US 2005/0178325 A1 (=EP 1 566 352 A2) cited above proposes increasing the partial vacuum in the feed chamber at least in part before opening the feed chamber's intake valve.

The object of the present invention is to increase the pumping rate without incurring thereby complex or costly steps.

The object of the present invention is attained by means of the appended claims, Further features of the present invention are contained in the dependent claims.

The invention allows raising the pumping rate in simple manner.

Moreover the present invention allows more accurately metering the powder feed volume rates.

According to the present invention, a control signal is generated to produce the partial vacuum in the feed chamber, no earlier than simultaneously with, or preferably by a predetermined delay after a control signal opening the powder intake valve was generated, as a result of which the partial vacuum begins increasing in the feed chamber, no earlier than simultaneously with opening the powder intake valve, preferably however after the above cited delay time beyond opening the powder intake valve. The predetermined delay time preferably shall be in the range of 0 to 50 ms for a feed-cycle period of about 200 ms of the feed chamber. However this embodiment mode does not preclude applying the present invention to other delay times and cycle-periods.

The present invention attains that the partial vacuum in the feed chamber shall oppose an opening displacement of the powder intake valve—especially it is a pinch valve—at least at the time the powder intake valve starts opening, than is the case in the state of the art.

The present invention is illustratively discussed below in relation to the appended drawings by means of a preferred embodiment mode.

FIG. 1 schematically shows a coating powder feeding device of the invention which is part of an electrostatic powder spraycoating apparatus.

Figure 2:
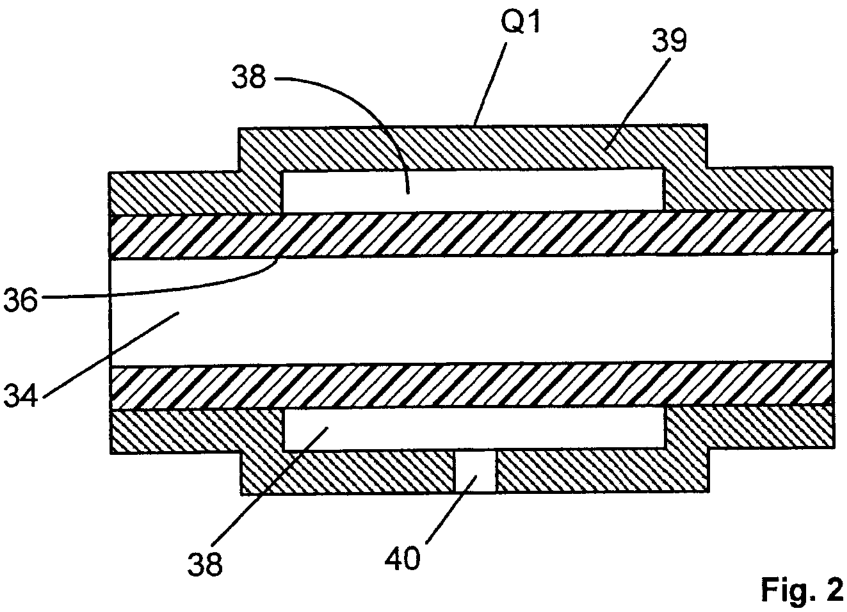
Figure 3:
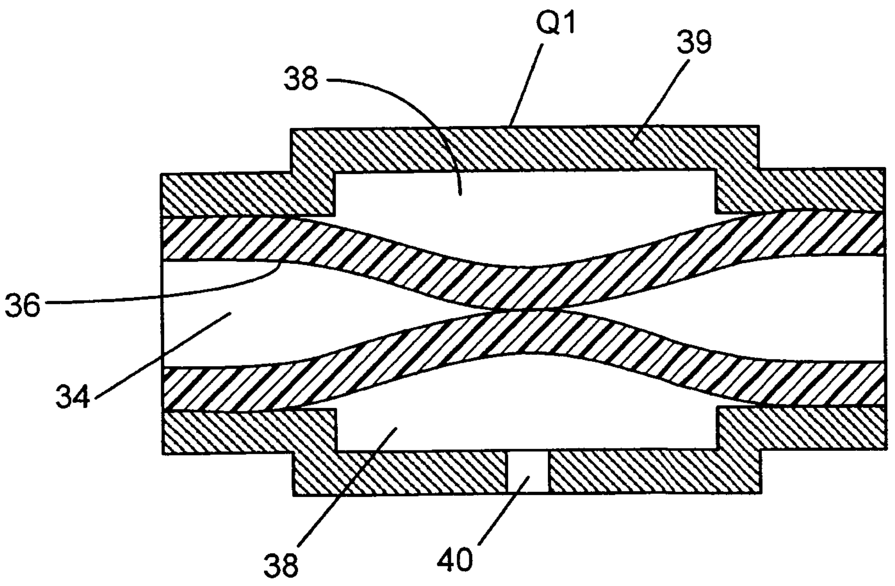

FIG. 2 schematically shows a longitudinal section of a pinch valve of FIG. 1 in its open state, and FIG. 3 schematically shows a longitudinal section of the pinch valve of FIG. 2 in its closed state.

FIG. 1 schematically shows a coating powder feeding device of the invention containing a dense phase powder pump 10 illustratively fitted with two feed chambers 12 and 14 configured in parallel each in a pump cylinder A respectively B each fitted with a powder intake valve Q1 and Q2 at a powder intake 12.1 and 14.1 and with a powder outlet valve Q3 and Q4 respectively at a powder outlet 12.2 and 12.4. For clarity, the powder intake valves Q1 and Q2 are shown away from the powder intakes 12.1 respectively 14.1, though in fact they are configured preferably immediately at the powder intakes 12.1 and 14.1. The powder outlet valves Q3 and Q4 respectively are shown away from the powder outlets 12.2 and 14.2 for clarity, though practically they are preferably mounted immediately at the powder outlets 12.2 and 14.2.

The pump cylinders A and B and their feed chambers 12 and 14 may be arbitrary. In the preferred embodiment mode of the present invention, each feed chamber 12 and 14 is constituted—at least over part of its straight length between its powder intake valve Q1 respectively Q2 and its powder outlet valve Q3 and Q4—by a filter 12.4 and 14.4 enclosing the feed chamber 12 and 14 and separating it from an intermediate chamber 12.5 and 14.5. The intermediate chamber 12.5 and 14.5 encloses the filter 12.4 and 14.4 and is situated in a pump housing 12.6 and 14.6. A gas hookup port 12.3 respectively 14.3 is constituted in the pump housing 12.6 and 14.6 and issues into the intermediate chamber 12.5 and 14.5 and is connected to a connector of a control valve 1.5 and 1.6. This hookup port of the control valve 1.5 respectively 1.6 can be loaded alternatively with a partial vacuum or with compressed air by switching this control valve 1.5 or 1.6. The filter 12.4 and 14.4 is permeable to gas but impermeable to coating powder. Preferably it is porous and made of a sintered material.

A powder moving conduit 16 is fitted with a preferably Y-shaped branch 20 with feed conduit branches 16.1 respectively 16.2 to move coating powder 17 out of a powder bin 18 and is connected to allow flow with the powder intake sides of the two powder intake valves Q1 and Q2. The powder outlet sides of the two powder outlet valves Q3 and Q4 each are connected by a discharge branch 22.1 respectively 22.2, preferably by a Y-shaped branch 24, to a powder discharge conduit 22.

The powder discharge conduit 22 may lead to a powder receiving bin or to a powder coating tool 26. The manual or automatic spray tool 26 is fitted preferably to at least one high voltage (hv) electrode 28 to electrostatically charge the coating powder 17. Illustratively the hv may be generated by a hv generator 30 integrated into the powder spray tool 26 and supplied from a current or voltage source 32 with electric power.

The powder intake valves Q1 and Q2 and the powder outlet valves Q3 and Q4 preferably are pinch valves. Their designs may be identical. Using the powder intake valve Q1 as a model, FIGS. 2 and 3 schematically show a preferred embodiment mode used also for all other valves Q2, Q3 and Q4. Their valve duct 34 is subtended by the inner surface of a flexible hose 36 separating the valve duct 34 from a pressure chamber 38 on the hose outer side in a housing 39. The valve duct 34 is the hose transmission aperture and is kept open by the tension in the hose 36 as shown in FIG. 2. When introducing a compressed gas, preferably air, into the pressure chamber 38 through a gas hookup 40, the hose is radially compressed and in this manner the valve duct 34 can be kept closed as shown in FIG. 3. When the compressed air is then removed from the pressure chamber 38, the hose 36 resumes its initial shape shown in FIG. 2, wherein said valve duct 34 is open again.

FIG. 1 shows nine control valves 1.1, 1.2, 1.3, 1.4, 1.5, 1.6, 1.7, 1.8 and 1.9 which may be driven independently from each other by an electronic control 42.

FIG. 1 also shows three pressure regulators 2.1, 2.2 and 2.3 and a vacuum source 44. The vacuum source 44 preferably is a vacuum injector.

The control valve 1.1 is connected to the powder intake valve Q1 and may alternatively may connect latter's pressure chamber 38 to a source of compressed air 46 or vent it. The control valve 1.2 is connected to the other powder intake valve Q2 and is able to alternatively connect its pressure chamber 38 to the compressed air feed conduit 46 or to vent it. The control valve 1.3 is connected the powder outlet valve Q3 and is able to alternatively connect its pressure chamber 38 to the compressed air feed conduit 46 or to vent it. The control valve 1.4 is connected to the other powder outlet valve Q4 and is able to alternatively connect its pressure chamber 38 to the compressed air feed conduit 46 or to vent it.

The compressed air feed conduit 46 and the control 42 may be connected to a source of compressed air 48 either directly or by means of pressure regulators.

Preferably one of the pressure regulators, namely 2.2, is configured between the control valves 1.1, 1.2, 1.3 and 1.4 on one hand and on the other hand the compressed air feed conduit 46, the closing pressure of the pinch valves Q1, Q2, Q3 and Q4 for powder feed operation being adjustable at said pressure regulator 2.2.

According to the embodiment of the present invention shown in FIG. 1, an additional pressure regulator 2.1 may be used in addition to the pressure regulator 2.2, only one of the two pressure regulators 2.2 or 2.1 being connectable alternatively by means of the control valve 1.9 to the pressure intake side of the control valves 1.1, 1.2, 1.3 and 1.4. Consequently a different air pressure may be set at the second pressure regulator 2.1 than at the pressure regulator 2.2, for instance a higher pressure. Illustratively the higher pressure of the second pressure regulator 2.1 may serve to generate a higher closing pressure in the valves Q1, Q2, Q3 and Q4 designed as pinch valves whenever the feed chambers 12 and 14 are used not for power feeding, but for cleansing with cleansing air.

Each pump cylinder A and B is fitted with a gas hookup port 12.3 respectively 14.3 to which is connected one of the two control valves 1.5 and 1.6 in order to supply the two feed chambers 12 and 14 alternatingly with compressed conveying air from the control 42 or to connect them to the vacuum source 44 and thereby to evacuate them.

Compressed air from the compressed air supply conduit 46 can be fed by means of the pressure regulator 2.3 and the control valve 1.7 to a vacuum injector 44 to generate in latter a partial vacuum which can be applied by means of the two independently driven control valves 1.5 and 1.6 alternatively to either of the feed chambers 12 and 14 respectively. The control valve 1.7 allows alternatively connecting the vacuum injector 44 in the manner discussed above to the compressed air supply conduit 46 or to vent it.

The feed chambers 12 and 14 can be connected by means of the control valves 1.5 and 1.6 alternatively to a partial vacuum hookup 50 of the vacuum injector 44 or by means of a compressed air conduit 52 to a compressed air outlet 54 of the control 42.

The preferred embodiment mode of FIG. 1 further comprises the control valve 1.8 by means of which the pressure side of the two control valves 1.5 and 1.6 of the feed chambers 12 and 14 alternatively can be connected to the compressed air supply conduit 46 of which the pressure exceeds that of the compressed feed air applied by the control 42 through the compressed air feed conduit 52. The higher pressure of the compressed air supply conduit 46 may be applied through the control valve 1.8 to the feed chambers 12 and 14 for instance when the feed chambers 12 and 14 and the powder conduits connected to them must be rinsed with compressed air.

The control 42 of the present invention is designed in a manner that it generates a control signal to the control valve 1.5 or 1.6 to generate the partial vacuum in the feed chamber 12 or the other feed chamber 14, no earlier than simultaneously with a control signal to the control valve 1.1 or 1.2 opening the related powder intake valve Q1 or Q2 in such a way that the partial vacuum in the feed chamber 12 or 14 shall build up, no earlier than simultaneously with opening the powder intake valve Q1 respectively Q2 associated with this feed chamber 12 or 14.

According to the preferred embodiment mode of the present invention, the control 42 generates the control signal for the control valve 1.5 or 1.6 to generate a partial vacuum in the pertinent feed chamber 12 or 14 at a predetermined time delay after the control signal has been applied to the related control valve 1.1 or 1.2 to open the powder intake valve Q1 or Q2 of the related feed chamber 12 or 14, as a result of which the partial vacuum in the pertinent feed chamber 12 or 14 shall build up at the defined time delay after opening the powder intake valve Q1 respectively Q2.

The predetermined time delay may be stored in permanent or variable manner in the control 42 or be adjustable for any application of the feed apparatus. Preferably the predetermined delay time is in the range between 0 and 50 ms.

The present invention allows diverse cleansing procedures to cleanse the various components by passing compressed air through or over them, either by a feed of compressed air from the control 42 or a feed of compressed air at a higher pressure from the compressed air supply conduit 46. This compressed rinsing air may be guided either through both feed chambers 12 and 14 simultaneously in the same direction or in opposite directions. Both feed chambers 12 and 14 may be cleansed individually or jointly. The compressed cleansing air may pass from the feed chambers 12 and 14 toward the powder discharge conduit 22 or reversely in the direction to the powder feed conduit 16. When rinsing, the powder intake valve Q1 respectively Q2 and the powder outlet valve Q3 and Q4 one and/or the other feed chamber 12 and 14 may be opened simultaneously to generate two mutually oppositely directed flows of compressed rinsing air jointly flowing through the gas hookup port 12.3 respectively 14.3. The flow of compressed rinsing air may be continuous or in pulses.

Instead of the preferred embodiment modes of pinch valves Q1, Q2, Q3 and Q4 shown in FIGS. 2 and 3, other pinch valves also may be used that are operated not by applying pneumatic pressure on the hose 36 to pinch it, but instead being operated by a mechanical element, for instance a plunger or the like. Such a mechanical element may be driven pneumatically, hydraulically or electrically.

The present invention is not restricted to the above described embodiment modes. Illustratively two gas hookup ports 12.3 and 14.3 may be used for each feed chamber 12 respectively 14, one of which being connectable to the vacuum source 44 and the other to the compressed feed air conduit 52.

The invention claimed is:

1. A powder coating feed method using a dense phase powder pump having at least one feed chamber fitted with a powder intake valve and a power outlet valve, the method comprising:

(a) generating a partial vacuum in said at least one feed chamber to aspirate coating powder into the feed chamber through the open powder intake valve while the powder outlet valve is closed;

(b) closing the powder intake valve and opening the powder outlet valve;

(c) introducing a compressed gas into the feed chamber to discharge the coating powder from the feed chamber through the open powder outlet valve while the powder intake valve is closed;

(d) closing the powder outlet valve and opening the powder intake valve; wherein generating a partial vacuum in the feed chamber by a control signal during the cycle segment (a) or when passing from the cycle segment (d) to the cycle segment (a) no earlier than simultaneously with generating a control signal to open the powder intake valve, wherein the initial partial vacuum buildup in the feed chamber takes place no earlier than simultaneously with the beginning of opening the powder intake valve, wherein generating the partial vacuum using the control signal during the cycle segment (a) or when passing from the cycle segment (d) to the cycle segment (a) at a predetermined delay time after the control signal opening the powder intake valve was generated, and wherein the partial vacuum buildup in the feed chamber begins at a defined time delay after opening the powder intake valve, using a pinch valve as the powder intake valve and as the powder outlet valve, wherein the pinch valves further comprise a flexible hose that separates a valve duct on the inner hose side from a pressure chamber on the hose outside and in that the hose is radially compressed shut by the pressure of an applied compressed gas introduced into the pressure chamber, thereby closing the valve duct.

2. The powder coating feed method of claim 1, further comprising:

providing at least two feed chambers running in parallel;

fitting each feed chamber with a powder intake valve and a powder outlet valve and in that powder is alternatingly aspirated into one of the feed chambers by partial vacuum through the corresponding powder intake valve;

discharging powder from another one of the feed chambers using compressed gas through the corresponding powder outlet valve; and wherein discharging powder by the compressed gas from the one feed chamber through the corresponding powder outlet valve and aspirating powder by a partial vacuum into the other feed chamber through the corresponding powder intake valve.

3. The powder coating feed method of claim 1, further comprising using separate control valves for each feed chamber to control the powder intake valve and the powder outlet valve;

driving said control valves separately;

providing a further separate control valve used to load the feed chambers alternatively with a partial vacuum or a compressed gas, and driving said further control valve separately.

4. The powder coating feed method of claim 1, further comprising using a dense phase powder pump wherein the chamber wall of the feed chamber is constituted at least over part of its length between its powder intake valve and the powder outlet valve by a filter enclosing the feed chamber and separating the feed chamber from an intermediate chamber enclosing the filter, said filter being permeable to gas but impermeable to coating powder, and in that the partial vacuum and the compressed gas are transmitted through this pressure chamber and through the filter into the feed chamber.

5. The powder coating feed method of claim 1, further comprising moving the powder by the dense phase powder pump to a powder spray tool.

6. A powder coating feeding device having a dense phase powder pump and at least one feed chamber fitted with a powder intake valve and a powder outlet valve, comprising:

a control device generating control signals to recurringly carry out (a) generating a partial vacuum in the feed chamber to aspirate coating powder into the feed chamber through the open powder intake valve while the powder outlet valve is closed, (b) closing the powder intake valve and opening the outlet valve, (c) introducing a compressed gas into the feed chamber to discharge the coating powder from the feed chamber through the open powder outlet valve while the powder intake valve is closed, (d) closing the powder outlet valve and opening the powder intake valve, wherein said control device generates a control signal during said cycle segment (a) or when passing from said cycle segment (d) to said cycle segment (a) no earlier than simultaneously with a control signal to open the powder intake valve, wherein the initial partial vacuum buildup in the feed chamber takes place no earlier than simultaneously with the initial opening of the powder intake valve, wherein the control device generates the control signal for generating the partial pressure in the feed chamber during said cycle segment (a) or when passing from said cycle segment (d) to said cycle segment (a) at a predetermined time delay after the control signal opens the powder intake valve, and wherein the partial vacuum buildup in the feed chamber begins at a defined time delay after opening the powder intake valve, wherein the powder intake valve and the powder outlet valve are pinch valves, and wherein the pinch valves are further comprise a flexible hose which separates a valve duct on the inner hose side from a pressure chamber on the hose outside and, wherein the hose can be radially compressed by the pressure of an applied compressed gas introduced into the pressure chamber, thereby closing the valve duct.

7. The powder coating feeding device of claim 6, wherein the dense phase powder pump further comprises at least two feed chambers configured in parallel, each feed chamber is fitted with a powder intake valve and a powder outlet valve, wherein the powder controlled by the control is alternatingly aspired by partial vacuum into one of the feed chambers through its powder intake valve and can be discharged from the other of the feed chambers by compressed air through the powder outlet valve, wherein the powder can be discharged from the feed chamber by using compressed air through the powder outlet valve and powder can be aspirated into the other feed chamber using a partial vacuum through its powder intake valve.

8. The powder coating feeding device of claim 6, wherein separate control valves are used for each feed chamber to drive the powder intake valve, and wherein the powder outlet valve and the control valves may be separately driven by the control valve and in that at least one further control valve is separately driven by the control valve provided to alternatively load the feed chambers with partial vacuum or compressed gas.

9. The powder coating feeding device of claim 6, wherein the minimum of one feed chamber of the dense phase powder pump is positioned over at least part of the length of the pump between the powder intake valve and the powder outlet valve, wherein a filter encloses the feed chamber and separates the feed chamber from an intermediate chamber between the filter and a housing, wherein said filter is permeable to a gas but not to the coating powder, and wherein the feed chamber is loaded alternatively through the filter with partial vacuum or a compressed gas.

10. An electrostatic powder spraycoating apparatus containing coating powder feeding device as claimed in claim 6, and a spray tool designed for electrostatic spraycoating and connected to the powder discharge conduit of the dense phase powder pump.

* * * * *